United States Patent [19]

Hamada et al.

[11] Patent Number: 5,365,304
[45] Date of Patent: Nov. 15, 1994

[54] CAMERA WITH CAMERA-SHAKE DETECTION APPARATUS

[75] Inventors: Masataka Hamada, Osakasayama; Eiji Yamakawa, Toyonaka; Hiroshi Ootsuka; Hisayuki Masumoto, both of Sakai; Takashi Okada, Osaka, all of Japan

[73] Assignee: Minolta Camera Kabushiki Kaisha, Japan

[21] Appl. No.: 120,443

[22] Filed: Sep. 14, 1993

Related U.S. Application Data

[62] Division of Ser. No. 987,778, Dec. 9, 1992, Pat. No. 5,270,767, which is a division of Ser. No. 632,075, Dec. 21, 1990, Pat. No. 5,218,442.

[30] Foreign Application Priority Data

Dec. 21, 1989 [JP] Japan ................. 1-333963
Dec. 21, 1989 [JP] Japan ................. 1-333964
Dec. 21, 1989 [JP] Japan ................. 1-333965
Dec. 21, 1989 [JP] Japan ................. 1-333966
Dec. 21, 1989 [JP] Japan ................. 1-333967

[51] Int. Cl.⁵ .................. G03B 5/00; H04N 5/228
[52] U.S. Cl. .................................. 354/430; 348/208
[58] Field of Search ............ 354/410, 430, 70, 202; 358/222

[56] References Cited

U.S. PATENT DOCUMENTS

| | | | |
|---|---|---|---|
| 4,788,596 | 11/1988 | Kawakami et al. | 358/222 |
| 4,860,045 | 8/1989 | Hamada et al. | 354/402 |
| 5,012,270 | 4/1991 | Sekine et al. | 354/430 |
| 5,109,249 | 4/1992 | Kitajima | 354/430 |
| 5,130,729 | 7/1992 | Sato et al. | 354/202 |
| 5,192,964 | 3/1993 | Shinohara et al. | 354/202 |
| 5,220,375 | 6/1993 | Ishida et al. | 354/430 X |

Primary Examiner—W. B. Perkey
Attorney, Agent, or Firm—Burns, Doane, Swecker & Mathis

[57] ABSTRACT

A camera wherein the light emitted by a subject, which has passed through a photographic optical system, is formed as an image on an area sensor, and which includes an electronic viewfinder that indicates the image of the subject based on the output from the area sensor and an apparatus that detects image shaking caused by camera shake, based on the output from the area sensor.

9 Claims, 14 Drawing Sheets (a) $\ell_0 = 0$
$c(-1, m_0) \geq c(1, m_0)$ (b) $\ell_0 = 0$
$c(-1, m_0) < c(1, m_0)$ (c) $\ell_0 = 1$
$c(0, m_0) < c(2, m_0)$ (d) $\ell_0 = 1$
$c(0, m_0) \geq c(2, m_0)$ (e)  $\ell_0 = -1$ $c(-2, m_0) \geqq c(0, m_0)$ (f)  $\ell_0 = -1$ $c(-2, m_0) < c(0, m_0)$ (g)  $\ell_0 = 2$ (h)  $\ell_0 = -2$

CAMERA WITH CAMERA-SHAKE DETECTION APPARATUS

This application is a divisional of application Ser. No. 07/987,778, filed Dec. 9, 1992, now U.S. Pat. No. 5,270,767 which is a divisional of application Ser. No. 07/632,075 filed Dec. 21, 1990, now U.S. Pat. No. 5,218,442.

BACKGROUND OF THE INVENTION

1. Field of the Invention

This Invention relates to a camera which is equipped with an apparatus for detecting camera shake and, more particularly, to a camera having both the above-mentioned shake-detecting apparatus and an electronic viewfinder which forms an image of the photo subject on an area sensor and displays the Image based on the output from the sensor. It also relates to a camera containing the above-mentioned shake-detecting apparatus and a focus-detection apparatus.

2. Description of the Related Art

Cameras with an electronic finder have been previously published. For example, such a camera is disclosed in a Laid-Open Patent Application Sho 62-35329. However, this camera does not contain an apparatus which detects camera shake.

On the other hand, cameras with an electronic finder which can also detect camera shake have also been published. One example is found In a Laid-Open Patent Application Sho 63-129328. According to the application, the shake-detecting camera with an electronic finder contains a CCD area sensor for detection of camera shake, and detects camera shake by comparing the Image at one instant with that at another instant. However, this camera does not use the TTL method.

Furthermore, video cameras containing a shakecorrecting optical system and an electronic finder have been published. One example Is disclosed in Laid-Open Patent Application Sho 61-150581. In video cameras, the area sensor is used for picture-taking, and the electronic finder is used to follow the subject. In the case of conventional video cameras with a shake-correcting optical system, as in the one in the above application, camera shake is detected and corrected through an angular velocity sensor.

One problem arising in connection with the above-given conventional cameras is that the camera tends to become larger, because it is equipped not only with an optical system and an area sensor for camera shake detection, but also with an electronic viewfinder which also comprises an optical system and an area sensor.

The camera in a Laid-Open Patent Application Sho 63-12932 described above does not include a shake-correcting optical system, and does not use the TTL method; therefore, it is not able to confirm the desired image's correction region. In the case of a video camera with a shake-correcting optical system and an electronic finder, although the shake-corrected image is viewable in the finder, the camera shake in the part of the camera where the image of the subject is formed cannot be corrected; consequently, the photo taken is blurred.

Moreover, because conventional cameras with an electronic finder and a shake-detecting apparatus do not use the TTL method, a parallax effect results. As a result, it has been difficult to correct the shake. Further, since video cameras which use the TTL method are not still cameras, it has not been necessary to consider the optical path.

On the other hand, while conventional auto-focus cameras contain a finder screen with a diffusing surface because the focal point is confirmed on this screen, conventional shake-detecting cameras perform the same function using a beam of light passing through the finder screen.

Where the finder screen has a diffusing surface, as in the case of conventional cameras, one problem has been that the beam which should strike the shake-detecting sensor becomes diffused and the light intensity on the sensor surface decreases. Another problem has been that the roughness of the diffusing surface creates an Image on the sensor, which reduces the precision of the shake-detecting capability. On the other hand, if the finder screen were made transparent, there would be a different problem: though the light intensity on the shake-detecting sensor would increase, it would no longer be possible to confirm the focal point on the finder screen.

In addition, in order to perform detection and correction of image shaking using the photo-Image detecting method, it is necessary to have a separate optical path for detection as well as a separate optical path for auto-focusing, since these operations are both performed during exposure.

One embodiment in which these two purposes are partly served by one optical path is published in a Laid-Open Patent Application Sho 57-133414. In this application, the optical path for auto-focusing is located just under the pentaprism, and images for shake detection purposes are produced through a half-mirror.

As explained above, in order to perform detection and correction of camera shake using the photo-image detecting method, it is necessary to have a separate optical path for shake detection in addition to the optical path for auto-focusing. Consequently, because of the necessity of having two different optical paths, compact cameras with these capabilities cannot be produced.

Further, in the case of the embodiment where the two purposes are partly served by one optical path, not much beam is available, since the area that the half mirror can reflect is only a fraction of the finder's field of vision; subsequently, there has been a problem of insufficient light.

SUMMARY OF THE INVENTION

The present invention was made in order to resolve the problems described above and provide a shake-detecting camera with an electronic finder which does not contain two different area sensors for (1) camera shake detection and (2) a finder indicating the entire photo area, but instead uses only one area sensor, which works on behalf of both the camera shake detection apparatus and the finder.

It is also the purpose of this invention to provide a camera with an electronic finder which allows photo-taking during automatic shake correction as well while the operator is visually confining the correction.

It is also the purpose of this invention to provide a shake-detecting camera with no parallax problems which can detect image shaking.

It is also the purpose of this invention to provide a shake-detecting and correcting camera which allows confirmation of the focal point on, the finder screen and can handle Images of low light-intensity.

It is also the purpose of this Invention to provide a compact shake-detecting camera which is not adversely affected by insufficient light.

The foregoing and other objects, features, aspects and advantages of the present invention will become more apparent from the following detailed description of the present invention when taken in conjunction with the accompanying drawings.

DESCRIPTION OF THE EMBODIMENTS

Figure 1:
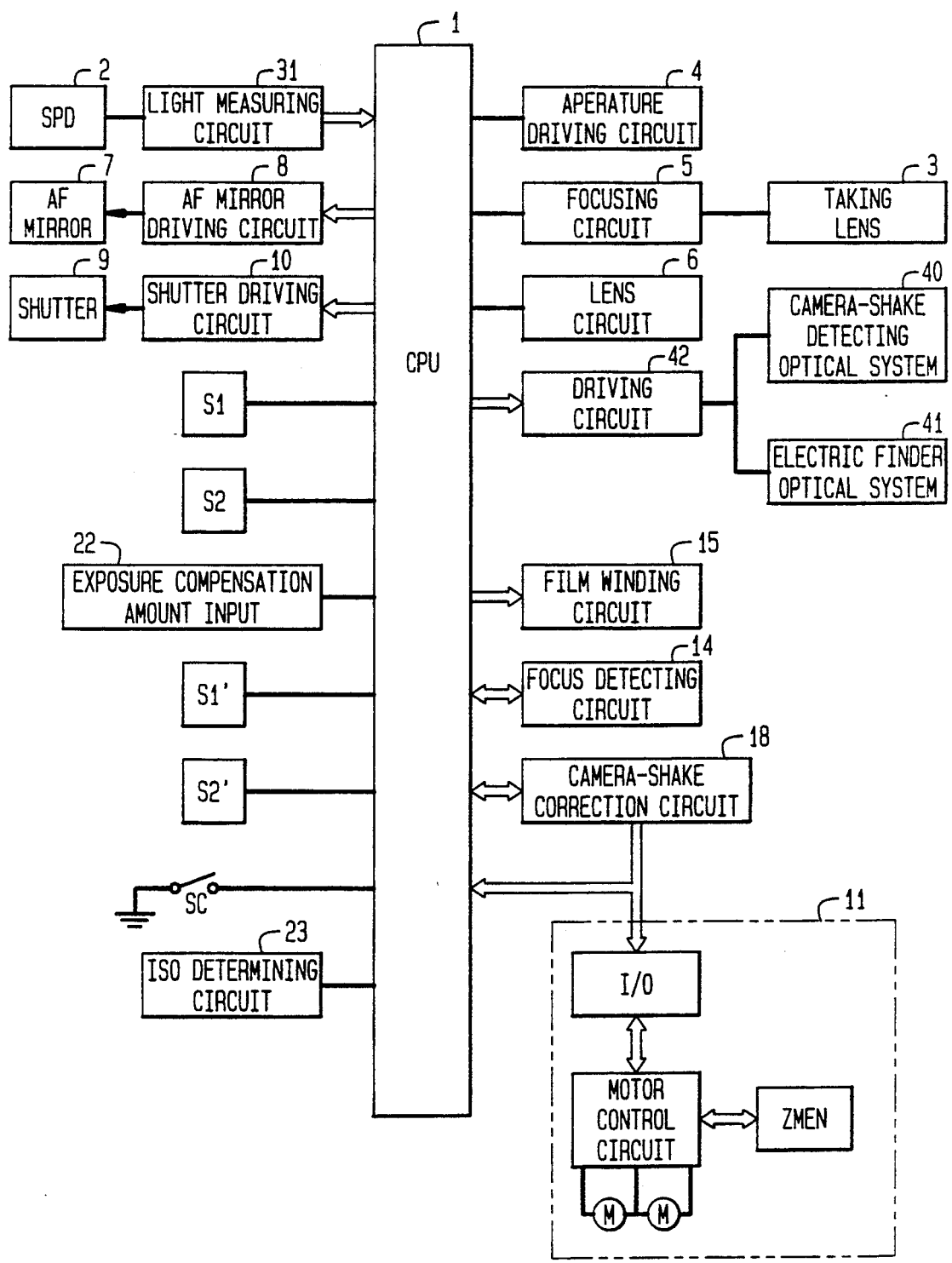
FIG. 1 is a block diagram of the Main CPU, which comprises the central component of the shake-detecting camera with an electronic finder provided by this invention.

The embodiments of the present invention are explained below with reference to drawings. FIG. 1 is a block diagram which indicates the main part of the shake-detecting camera provided by this invention.

In FIG. 1, signals from photometric SPD (Silicon Photodiode) 2 are input to Light Measuring Circuit 31. Light Measuring Circuit 31 calculates the output from SPD 2 and transmits the calculated result to Main CPU 1. Taking Lens 3 is removable and interchangeable. Aperture movement and focusing are performed through Aperture Driving Circuit 4 and Focusing Circuit 5. In Lens Circuit 6 is saved the F-number for Taking Lens 3, focal length, and various parameters for shake correction. Further, Taking Lens Circuit 6 contains an actuator which drives the shake-correcting optical system and a control circuit.

Auto-Focus Mirror 7 reflects part of the light passing through Taking Lens 3 to Focus Detecting Circuit 14. Auto-Focus Mirror 7 is retracted by Auto-Focus Mirror Driving Circuit 8 so as not to prevent the light from reaching the film during film exposure. Shutter 9 is a focal plane shutter. It contains a front shutter and a rear shutter, and is driven by Shutter Driving Circuit 10. Switch S1 turns on when the shutter release button is pressed to the first stage, and performs auto-focusing and photometric functions. Switch S2 turns on when the shutter release button is pressed to the second stage. Film Winding Circuit 15 performs winding and rewinding of film. Switches S1' and S2' are shutter release buttons located in the remote finder, described below, and function in the same manner as switches S1 and S2. Switch SC is a switch to operate the continuous photo-taking mode.

Shake Detecting Optical System 40 and Electronic Finder Optical System 41 are optical systems which transmit light to the shake-detecting CCD, described below, and are driven by Optical System Driving Circuit 42. When shake detection is performed, Shake Detecting Optical System 40 is employed, and when display of the photo image is performed using the above CCD, Electronic Finder Optical System 41 is used. Further, Shake Correcting Circuit 18, described below, is linked to the Main CPU for the purpose of detecting camera shake. Shake Correcting Circuit 18 communicates with Shake Detection/Correction Means 11.

Furthermore, Exposure Compensation Amount Input Means 22, which adjusts the amount of exposure based on the photometric value, and ISO Determining Circuit 23, which determines film sensitivity, are linked to the Main CPU.

Figure 2A:
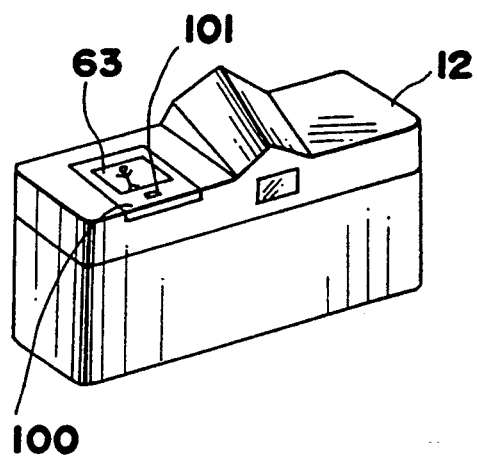
FIGS. 2A through 2D are drawings explaining how the electronic finder is mounted to the camera body.
Figure 2C:
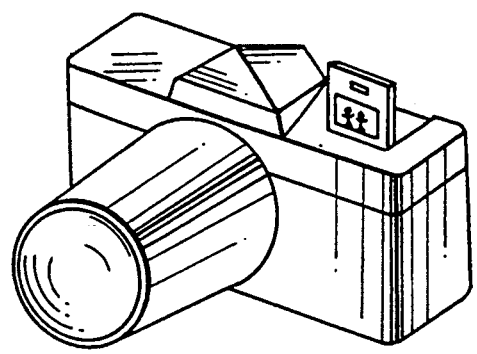
Figure 2B:
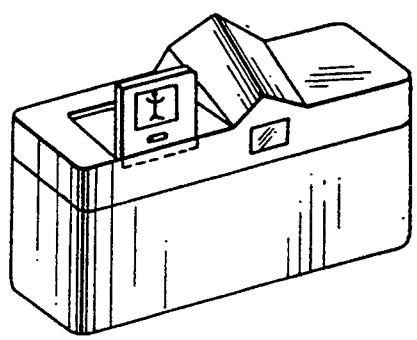

Next, the electronic finder is explained below. FIGS. 2A through 2D illustrate how the electronic finder is used. In FIG. 2A, Electronic Finder 100, which can be pulled in an upward direction and detached, is mounted on the upper side of Camera Body 12. Electronic Finder 100 includes LCD 63 for the display of the finder image and Shutter Release Button 101. When Electronic Finder 100 is used as in FIG. 2A, it is used as a waist level finder. FIG. 2B illustrates the camera with Electronic Finder 100 pulled up towards the operator. The operator can see the finder image without peering into the finder eyepiece. Therefore, it is possible to take photos while holding the camera at the chest level or above the head, confirming the photo image by observing the finder image. FIG. 2C illustrates the camera with Electronic Finder 100 pulled up towards the front. This makes it possible for the operator to take a photo with a self-timer while ensuring the desirability of the photo image through the finder image. In this case, however, the image on Finder Image Indication LCD 63 is upside down.

Figure 2D:
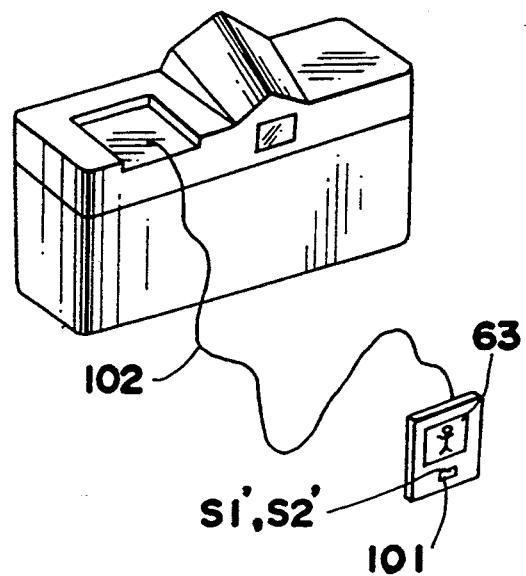

FIG. 2D illustrates the camera when Electronic Finder 100 is detached from Camera Body 12. With Electronic Finder Extension Cord 102, the operator can take a photo at a distance from the camera by pressing Shutter Release Button 101, while confirming the image quality by observing the tinder image in LCD 63.

Image signals to LCD 63 are received by Camera Shake Detection Sensor 44's CCD Image-Sensing Unit 51, explained below with reference to FIG. 7. The CCD exposure period at this time is determined in accordance with the camera exposure. Therefore, an image shown on LCD 63 is essentially same as that of an image exposed on a film. When exposure compensation is performed during auto-exposure photographing, Exposure Compensation Amount Input Means 22 should be adjusted so that the area to which the operator wants to adjust the exposure can be observed on LCD 63 with good shade gradation. When setting the exposure during manual exposure photographing, the aperture and shutter speed should be adjusted so that the area to which the operator wishes to adjust the exposure can be observed on LCD 63 with good shade graduation as well. In addition, when the operator wishes to intentionally overexpose or underexpose the photo, a picture with the intended exposure can be easily obtained if the exposure is determined by observing LCD 63.

Figure 3A:
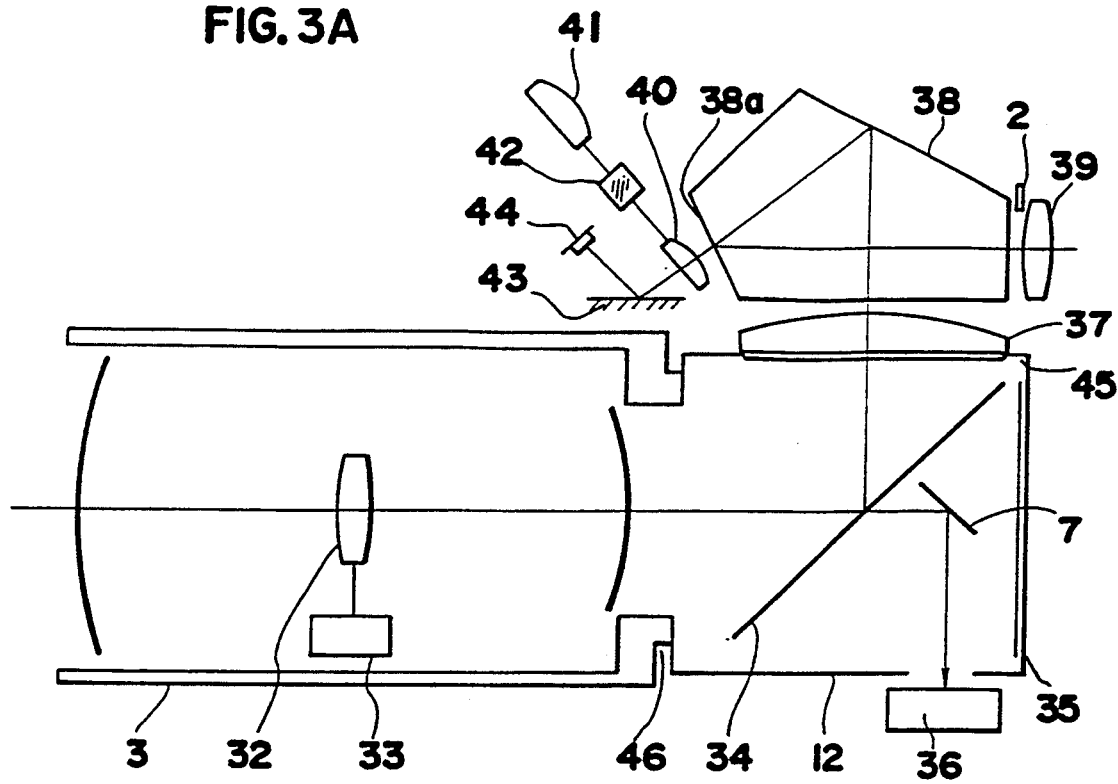
FIG. 3A illustrates the optical system of the shake-detecting camera with an electronic finder provided by this invention.

FIG. 3A illustrates the optical system of the shake-detecting camera with an electronic finder provided by this invention. In FIG. 3A, Taking Lens 3 contains Shake Correction Lens 32 and Shake Correction Lens Drive Unit 33, which moves Shake Correction Lens 32. Since the details of Shake Correction Lens Drive Unit 33 are public knowledge, their explanation is omitted here. Inside Camera Body 12 is affixed Pellicle Mirror 34, which reflects part of the beam passing through Taking Lens 3 towards the finder optical system, with the remaining beam passing through to Shutter 35. The part of the beam which passes through Pellicle Mirror 34 is reflected toward Focus Detection Module 36 by means of Auto-Focus Mirror 7. Auto-Focus Mirror 7 is retracted by Auto-Focus Focus Mirror Driving Circuit 8 (not indicated in the FIG.) to a position where it does not prevent the beam from reaching the film during film exposure.

The beam reflected by Pellicle Mirror 34 passes through Condenser Lens 37 and enters Pentaprism 38. On one side of Eyepiece 39 of Pentaprism 38 is located photometric SPD 2. Surface 38a of Pentaprism 38 is a half mirror, which allows part of the beam to escape Pentaprism 38. The escaping beam passes through Shake Detecting Optical System 40 and reaches Shake Detection Sensor 44 after being reflected by Reflection Mirror 43. Shake Detecting Optical System 40 and Electronic Finder Optical System 41 are driven by Optical System Driving Circuit 42, and are alternately driven in and out of the optical path. Shake Detecting Optical System 40 and Electronic Finder Optical System 41 respectively re-form the image on Finder Focal Plane 45, located on Shake Detection Sensor 44. Shake Detection Sensor 44 is a CCD area sensor. Pentaprism 38 could be a hollow pentamirror containing air inside, instead of a glass block.

Since the light from a photo subject is transmitted to the area sensor, i.e., Shake Detection Sensor 44, using Pellicle Mirror 34, as explained above, camera-shake detection can be performed by the photo-image detection method with a TTL camera. Further, since Pentaprism 38 is used in the optical path to Shake Detection Sensor 44, a separate optical path to the sensor is not necessary.

Figure 3B:
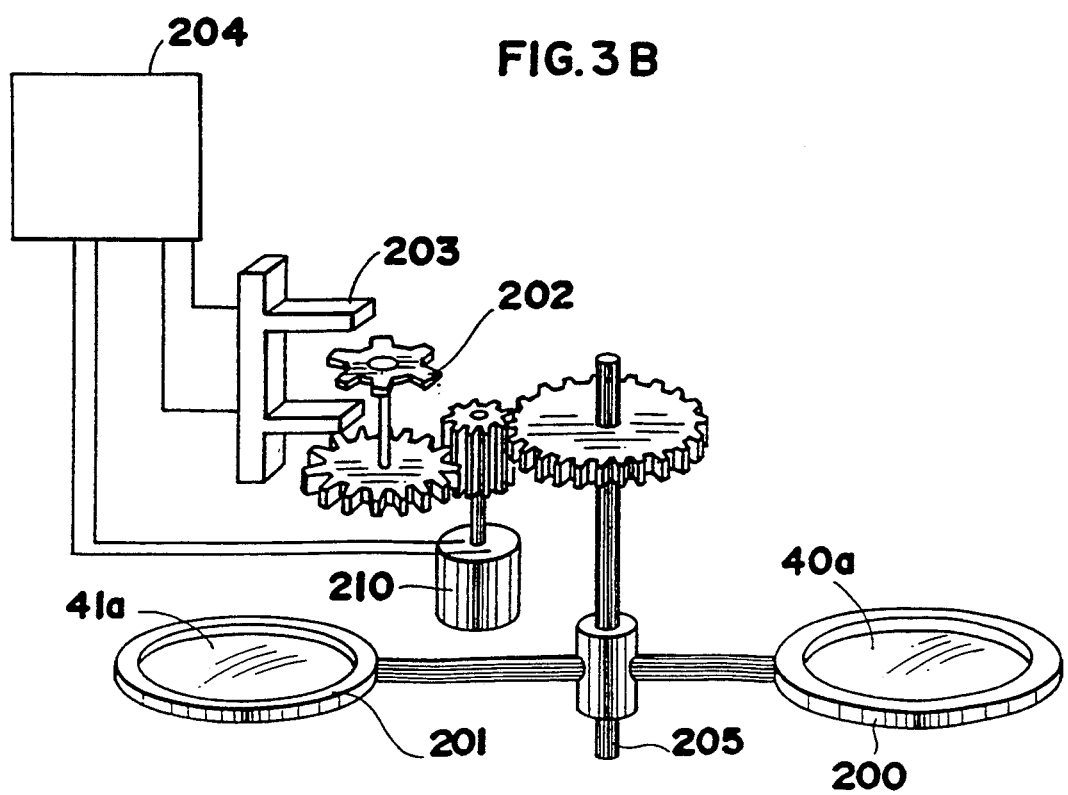
FIG. 3B illustrates details of the driver of the shake-detecting optical system.

FIG. 3B illustrates the details of Optical System Driving Circuit 42. In the FIG., Lens Holders 200 and 201, which secure Lens 40a of Shake Detecting Optical System 40 and Lens 41a of Electronic Finder Optical System 41, respectively, are affixed to Rotation Axle 205, which is connected to Motor 210 by means of gears. The axis of Motor 210 moves in conjunction with Encoder Propeller 202 by means of gears, and the rotation of Encoder Propeller 202 is monitored by Photo Coupler 203. On/off signals are generated every time the light between the two arms of Photo Coupler 203 is interrupted by the rotation of Encoder Propeller 202. Controller 204 counts these pulse signals. Consequently, the number of rotations of the rotation axis is monitored. By the turning on and off of power to Motor 201 according to the monitored signals, Lens 40a of Shake Detecting Optical System 40 and Lens 41a of Electronic Finder Optical System 41 are rotated. Thus, Shake Detection Optical Driving Circuit 42 switches the optical path from Shake Detecting Optical System 40 to Electronic Finder Optical System 41 and vice versa.

As explained above, in this invention, the optical system to be projected onto Shake Detection Sensor 44 is alternated by means of Optical System Driving Circuit 42. As a result, the sensor image area alternates between that used for the purpose of shake detection and the area designated for focusing.

Figure 4A:
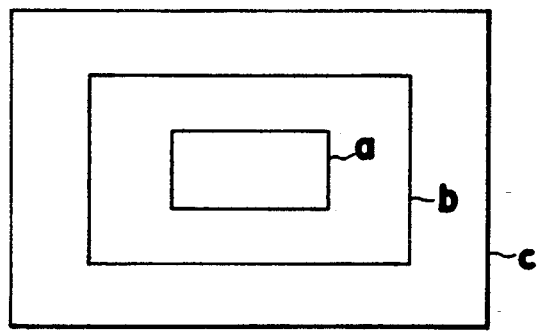
FIGS. 4A through 4C show the screen of the electronic finder.
Figure 4B:
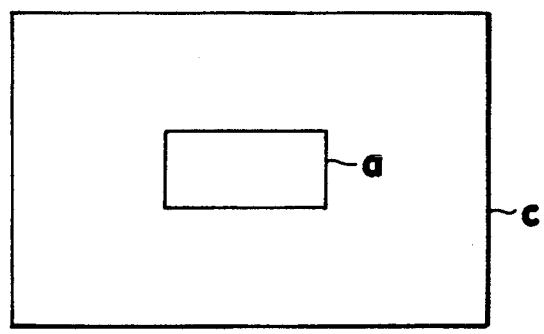
Figure 4C:
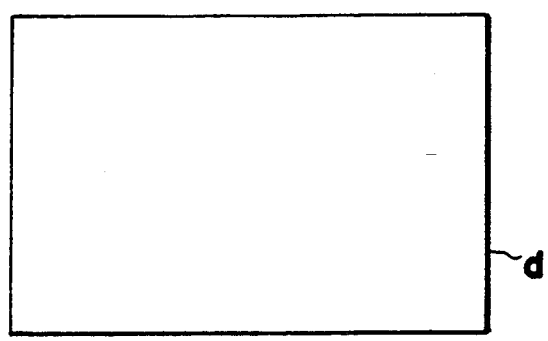

FIGS. 4A through 4C show the finder screen. The area indicated by (a) in FIGS. 4A and 4B is a transparent shake detection area. This area allows the amount of light to Sensor 44 to increase while the optical path to the sensor is maintained. The area indicated by (c) is a matted area of the finder screen, where the light diffuses. In the same manner as conventional cameras, an image is formed in this area to detect the correct focal point. The area indicated by (a) is also employed to indicate the borders of the shake detection area. The area (b) In FIG. 4A is the field of vision of the electronic finder. This area is also transparent so as to allow the amount of light reaching Electronic Finder Optical System 41 to increase. FIG. 4C Illustrates the case in which the entire area of the finder screen is transparent.

The image in area (a), part of the central region of finder screen (c), is projected onto the image-sensing surface by Shake Detecting Optical System 40. This image is used by Shake Detection Sensor 44. Further, when Electronic Finder Optical System 41 is in use, almost the entire area of finder screen (c) is projected on the image-sensing surface, and this image is used by the electronic finder.

In FIG. 3A, Taking Lens 3 is mounted on Camera Body 12 by means of Lens Mount Unit 46, and is removable and interchangeable.

In the event that an ordinary non-shake-correcting lens is mounted on Camera Body 12, a warning is indicated on the finder screen when camera-shake is detected. The warning may be displayed-in written form on the electronic finder.

Figure 5:
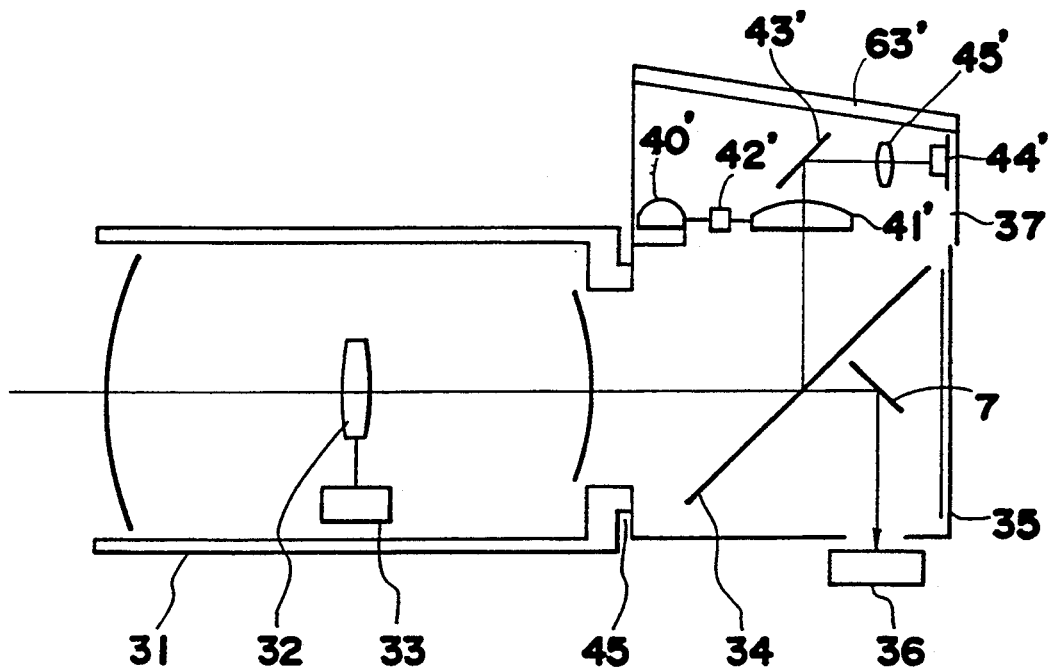
FIG. 5 illustrates a modified version of the optical system shown in FIG. 3A.

FIG. 5 illustrates another embodiment of this invention. In this embodiment, Pentaprism 38, shown in FIG. 3A, is omitted. Since this embodiment does not contain Pentaprism 38, the finder screen or Condenser Lens 37, the total cost may be reduced accordingly, and the camera made lighter and more compact. In front of Shake Detection Sensor 44' is located Image Re-forming Lens 45'. Small Area Relay Lens 40' and Large Area Relay Lens 41' are alternately employed, thereby changing the beam reaching area sensor 44. Located in the optical system of this embodiment are Reflection Mirror 43 and Optical System Drive Actuator 42'.

Figure 6A:
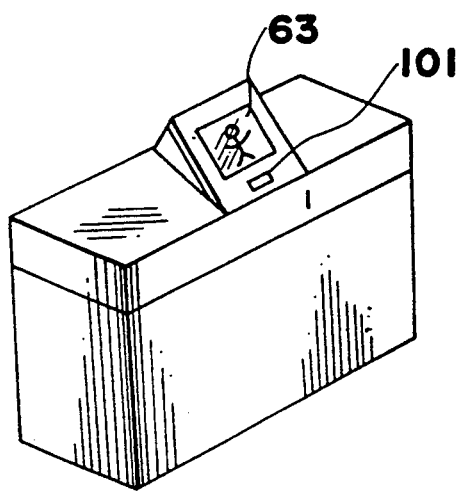
FIGS. 6A and 6B illustrates how the electronic finder is mounted in the embodiment shown in FIG. 5.
Figure 6B:
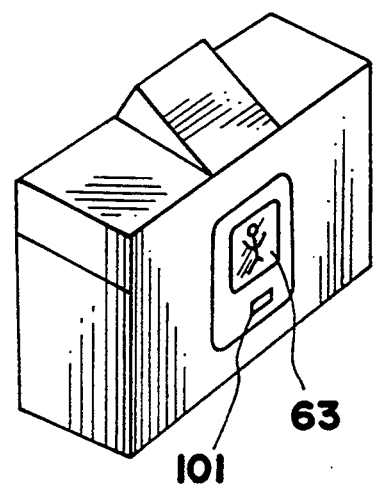

FIGS. 6A and 6B illustrate how the finder screen is used in conjunction with the optical system of this embodiment shown in FIG. 5. These figs. correspond to FIGS. 2A through 2D of the first embodiment. In FIGS. 6A and 6B, Electronic Finder 63 is detachable.

Next, Shake Detection Correction Means 11 is explained with reference to FIG. 7. Shake Detection Sensor 44 contains CCD Image-Sensing Unit 51. Light Intensity Monitor 53, which controls the integral time of the CCD, and Light Measuring Circuit 54. Clock Generator 55 determines the integral time of the CCD and the gain of the output amplifier by detecting the output of Light Measuring Circuit 54. Clock Generator 55 also generates a CCD drive clock and clocks for A/D Converter 61, D/A Converter 58, Sensitivity Correction Data Memory 59, and Dark Current Correction Data Memory 60. The output of Shake Detection Sensor 44 is input to A/D Converter 61 through Differential Amplifier 56 and Gain Control Amplifier 57. Dark Current Correction Dam Memory 60 and Sensitivity Correction Data Memory 59 contain data regarding sensitivity variations in the CCD and data for control of dark current which is output when the CCD receives no light. Dark Current Correction Data Memory 60 inputs data to D/A Converter 58. The D/A conversion output signals are input into the differential input of Differential Amplifier 56. This controls the dark current of CCD 51. Gain Control Amplifier 57 is an amplifier whose degree of amplification is controlled by digital signals. Gain Control Amplifier 57 is controlled by the sensitivity variation data saved in Sensitivity Correction Data Memory 59, and controls sensitivity variations in the output of the CCD.

The output signals of the A/D Converter are saved in Image Memory 64, Basic Memory 65 or Reference Memory 66. Address Generator 67 generates address data necessary for operation of Image Memory 64, Basic Memory 65 and Reference Memory 66.

Calculation Circuit 68 contains Subtraction Circuit 69, Absolute Value Circuit 70, Addition Circuit 71 and Register 72. The data of Basic Memory 65 and Reference Memory 66 are given as input.

Calculated results from Calculation Circuit 68 are saved in either Correlation Memory 73, Vertical Contrast Memory 74 or Horizontal Contrast Memory 75. These memories are linked to Control CPU 76 and can be accessed from Control CPU 76. Control CPU 76 also controls Address Generator 67 and Clock Generator 55. Data in Image Memory 64 are convened by D/A Converter 77 and input to Image Signal Processing Circuit 62. Switch SRV is a switch which turns "ON" when LCD 63, the electronic finder, is pulled up towards the operator. When this switch is turned "ON", Image Signal Processing Circuit 62 turns the images upside down and displays them on LCD 63.

Next, the methods of camera shake detection and calculation of the degree of the shake will be shown below. First, the sequence of shake detection will be explained. In this invention, the subject image is detected by Area Sensor 44, which can detect two-dimensional photo image data. The shake of the image is determined by detecting discrepancies between the subject image at one time and that at another.

CCD 51 is an area sensor comprising I×J pixels. Basic Memory 65 and Reference Memory 66 are I×J-word memories, while Correlation Memory 73 is a memory with the capacity of H×H words. The photoreceptive surface of CCD 51 is divided into M×N blocks for the purpose of explanation. Each block consists of adjoining K×L pixels. Vertical Contrast Memory 74 and Horizontal Contrast Memory 75 are memories with the capacity of M×N words.

The sequence of shake detection will be explained below. In this explanation, it is assumed that I=68, J=52, K=8, L=8, M=8, N=6 and H=5. The processing capability of A/D Converter 61 is 8 bits and that of Register 72 is 14 bits. One word in either Vertical Contrast Memory 74 or Horizontal Contrast Memory 75 is indicated by 14 bits.

Figure 8:
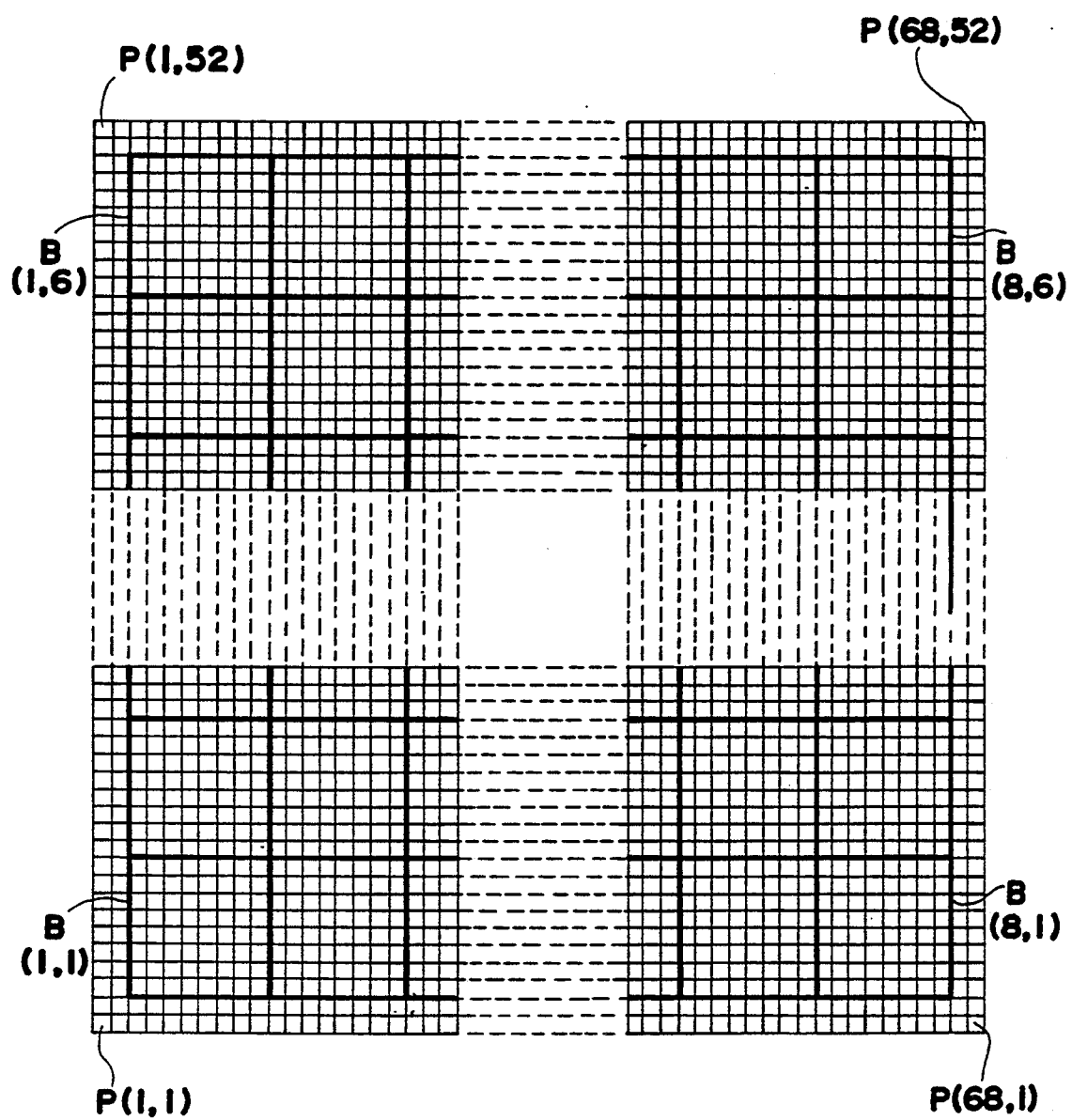
FIG. 8 is a model diagram of the Light receptacle of the CCD.

FIG. 8 is a model diagram of part of the photo-receptive area of CCD 51. In the fig., the pixel at bottom left is called P (1,1) while the pixel at top right is called P (68,52). Except for two rows of pixels on the circumference, the photoreceptive area of CCD 51 is divided into blocks consisting of 8×8 pixels. In the fig., the areas indicated by bold lines each represent blocks. We will call the lower left block B (1,1) and the upper right block B (8,6).

The sequence of shake detection can be roughly divided into the following three parts:
(1) Contrast calculation and selection of blocks
(2) Correlative calculation
(3) Interpolative calculation Contrast calculation is performed for selection of blocks. Some parts of the subject whose image is formed on the photoreceptive unit of CCD 51 are useful for shake detection, while others are not. In this embodiment, contrast calculation is performed in order to select those parts suitable for shake detection. The contrast of the subject image in each block is calculated and shake detection is performed using a total of eight blocks, i.e., four blocks having high vertical contrast and four blocks having high horizontal contrast.

(1) Contrast Calculation and Block Selection

First, the output of CCD 51 is saved in both Basic Memory 65 and Reference Memory 66. Using this data, vertical contrast and horizontal contrast are calculated for each block. The calculation is performed in the order of horizontal contrast of Blocks (1,1), (2,1), etc., (7,6) and (8,6) and vertical contrast of Blocks (1,1), (2,1), etc.. (7,6) and (8,6).

Assuming the output of P (i,j) of CCD 51 is A(i,j), the horizontal contrast of B (k,l) is defined as $$HC(k,l) = \sum_{j=8(l-1)+3}^{8l+2} \sum_{i=8(k-1)+2}^{8k+2} |A(i,j) - A(i+1,j)|$$

and the vertical contrast as $$VC(k,l) = \sum_{j=8(l-1)+2}^{8l+2} \sum_{i=8(k-1)+3}^{8k+2} |A(i,j) - A(i,j+1)|$$

Figure 7:
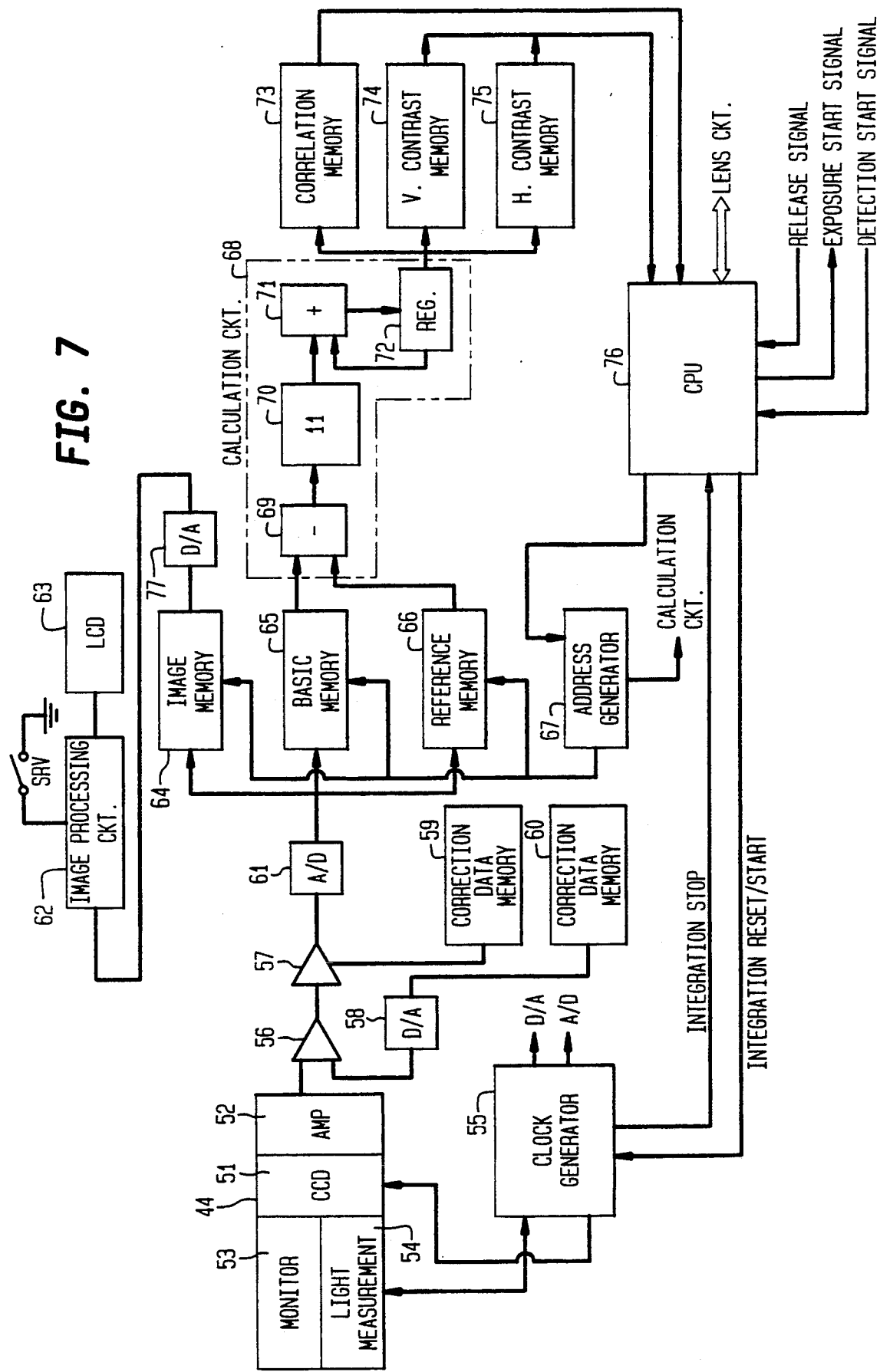
FIG. 7 is a block diagram of the camera shake detecting/correction system.

The sequence of the above calculation in the hardware illustrated in FIG. 7 is explained below. It is assumed that the content of Basic Memory 65, corresponding to the output data of P (i,j) of CCD 51, is R(i,j), and that of Reference Memory 66 is S(i,j).

First, Register 72 is cleared. Next, an address is sent from Address Generator 67 so that R(i,j) is given to one input terminal of Subtraction Circuit 69 and S(i+1,j) to its other input terminal (provided, however, that i=8(k−1)+2, j=8(l−1)+2). The data calculated in Subtraction Circuit 69 are then input into Absolute Value Circuit 70 and absolute values obtained. Then the data is added to the contents of Register 72 by Addition Circuit 71 and saved by Register 72. Then an address which will make i=i+1 is sent from Address Generator 67, and the same calculation is performed. Thus, after processing is performed within the range where i=8(k−1) +2~8k+2, j=8(l−1)+3~8l+2, $$\sum_{j=8(l-1)+3}^{8l+2} \sum_{i=8(k-1)+2}^{8k+2} |R(i,j) - S(i+1,j)|$$

is saved in Register 72.

The same content A(i,j) is saved in Basic Memory 65 and Reference Memory 66, and since A(i,j)=R(i,j)=-

S(i,j), the contents of Register 72 equal horizontal contrast:

$$HC(k,l) = \sum_{j=8(l-1)+3}^{8l+2} \sum_{i=8(k-1)+2}^{8k+2} |A(i,j) - A(i+1,j)|.$$

When calculation of one block is completed, the contents of Register 72 are transferred to the part corresponding to that block in Horizontal Contrast Memory 75 and saved.

In the same manner, the horizontal contrast of all remaining blocks is calculated and saved in Horizontal Contrast Memory 75.

Next, vertical contrast is calculated. As in the case of horizontal contrast, Register 72 is first of all cleared. Then, an address is sent from Address Generator 67 so that R(i,j) is given to one input terminal of Subtraction Circuit 69 and S(i,j+1) is given to the other input terminal (provided, however, that i=8(k−1)+3, j=8(l−1)+2). Absolute values are then determined for the data processed in Subtraction Circuit 69. This data is then added to the content of Register 72 and saved. Next, an address that will make i=i+1 is sent from Address Generator 67 and calculation is performed in the same manner. Thus, processing is performed within the range where i=8(k−1)+3~8k+2, j=8(l−1)+2~8l+2. Subsequently, $$\sum_{j=8(l-1)}^{8l+2} \sum_{i=8(k-1)+3}^{8k+2} |R(i,j) - S(i,j+1)|$$

is saved in Register 72. Since A(i,j)=R(i,j)=S(i,j), the contents of Register 72 equal vertical contrast:

$$VC(k,l) = \sum_{j=8(l-1)+2}^{8l+2} \sum_{i=8(k-1)+3}^{8k+2} |A(i,j) - A(i,J+1)|$$

When calculation of one block is completed, the contents of Register 72 are transferred to the part corresponding to that block in Vertical Contrast Memory 74 and saved.

In the same manner, vertical contrast of all remaining blocks is calculated and saved in Vertical Contrast Memory 74.

The Control CPU selects a block having the highest contrast, either horizontal or vertical, using the data obtained in the above fashion. Then it selects a block having the second highest contrast in the opposite direction of the first selection (for example, if vertical contrast is the first selection, horizontal contrast is the second selection) from among the remaining blocks. In this manner, a total of eight blocks are alternately selected (four blocks each for vertical and horizontal contrast). The selected blocks are B1~B8.

(2) Correlative Calculation

The data used for contrast calculation as standard image data remain in Basic Memory 65. New data is read out of CCD 51 in sequence, and each time new data is read out, it is written into Reference Memory 66 as a reference image. Each time new data is written into Reference Memory 66, the standard image and the reference image are compared and any spatial discrepancy between the two is detected as image shake. The image shake is calculated by correlative calculation and interpolative calculation, which will be explained below.

The correlative value of block Bk (k=1,2, ... 8) is defined by the following formula:

$$Ck(l,m) = \sum_{j=jk}^{jk+7} \sum_{i=ik}^{ik+7} |S(i+1,j+m) - R(i,j)|$$

$$(l,m) = -2, -1, 0, 1, 2)$$

(i$_k$, j$_k$ means the smallest number of pixels in Bk.)
In the case of l=m=0, the formula reads as follows:

$$Ck(0,0) = \sum_{j=jk}^{jk+7} \sum_{i=ik}^{ik+7} |S(i,j) - R(i,j)|.$$

This is the value to which one block's absolute value of the difference between the standard image and reference image regarding data from the same pixels is added.

In cases other than l=m=0, Ck(l,m) is a value to which one block's absolute value of the difference between the data of P (i,j) of the standard image and the data of P (i+l, j+m) of the reference image. The total of the correlative values of the eight blocks is $$C(l,m) = \sum_{k=1}^{8} Ck(l,m)$$

$$(l = m = -2, -1, 0, 1, 2)$$

One input terminal of Subtraction Circuit 69 is connected to Basic Memory 65 and the other input terminal is linked to Reference Memory 66. Therefore, an address determined by the Control CPU is sent from Address Generator 67 so that R(i,j) is input into one input terminal of Subtraction Circuit 69 and S(i+l, j+m) are input into the other input terminal, and the i and J data within a prescribed range are processed. Then, C(l,m) is obtained in Register 72. This data is transferred to a prescribed address of Correlation Memory 73 and saved. By repeating the above process, changing the value for l and m, all correlative values C(l,m):(l,m=−2,−1,0,1,2) are obtained.

(3) Interpolative calculation

When the calculated correlative values C(l,m) are aligned with l on the horizontal axis and m on the vertical axis, the following configuration is obtained:

| C(−2, 2)  | C(−1, 2)  | C(0, 2)  | C(1, 2)  | C(2, 2)  |
|-----------|-----------|----------|----------|----------|
| C(−2, 1)  | C(−1, 1)  | C(0, 1)  | C(1, 1)  | C(2, 1)  |
| C(−2, 0)  | C(−1, 0)  | C(0. 0)  | C(1, 0)  | C(2. 0)  |
| C(−2, −1) | C(−1, −1) | C(0, −1) | C(1, −1) | C(2, −1) |
| C(−2, −2) | C(−1, −2) | C(0, −2) | C(1, −2) | C(2, −2) |

When there is no discrepancy between the standard image and the reference image, C(0,0) is 0; the further C(l,m) is from the center, the larger it becomes. If the reference image diverges from the standard image by l$_0$ to the right and m$_0$ to the top, C(l$_0$,m$_o$) is 0; the more it moves away from this value, the lager C(l,m) becomes. However, the discrepancy in terms of pixels is not always expressed by a whole number. In addition, since the speed of image shake is not fixed, the shake-caused blur on the standard image and that on the reference image may be different. Where the distribution of correlative values C(l,m) in such a case is represented by contour lines, a fig. resembling FIG. 9 is the result.

Figure 9:
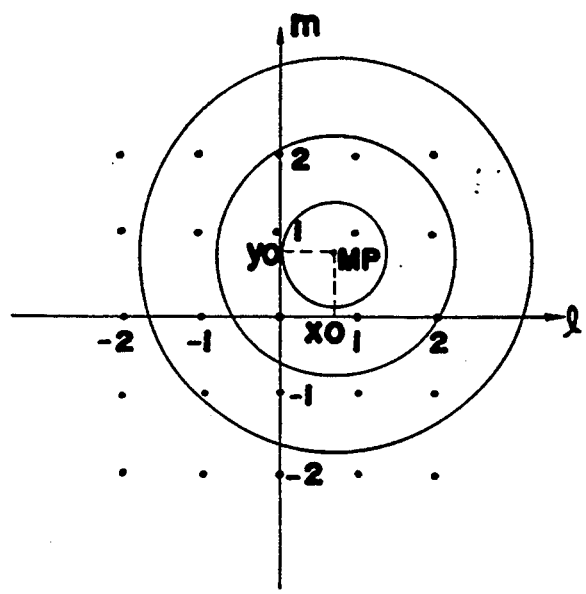
FIG. 9 is a drawing explaining correlative values for determining the degree of camera shake.

In FIG. 9, though values are obtained only for the lattice points, contour lines are drawn on imagined values between those points. The closer to the center the contour line is, the smaller the values become. The center of the contour lines is Point MP on coordinate $(x_0,y_0)$; here the reference image diverges from the standard image by $x_0$ horizontally and $Y_0$ vertically.

Since values obtained via correlative calculation are those on the lattice points only, it is necessary to find the value for Point MP through interpolative calculation using the lattice point dam.

The magnification of Shake Detecting Optical System 40, the pixel size of CCD 51, and the time needed to perform integration are set so that Point MP is $-1.5 < x_0, y_0 < 1.5$, taking into consideration the actual degree of camera shake.

The interpolative calculation performed after correlative calculation is completed will be explained below.

Figure 10:
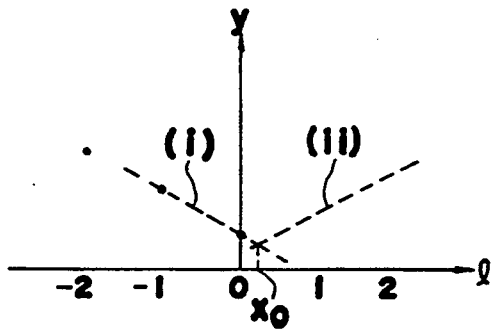
FIGS. 10 (a)–10(h) are drawings explaining the method of interpolative calculation.
Figure 10:
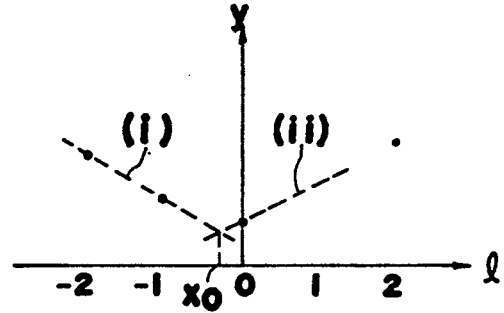
Figure 10:
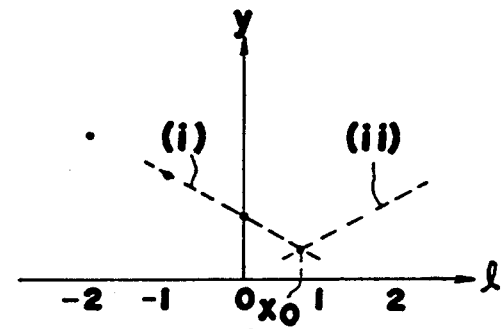
Figure 10:
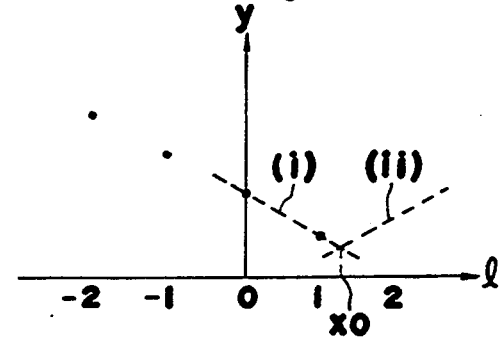
Figure 10:
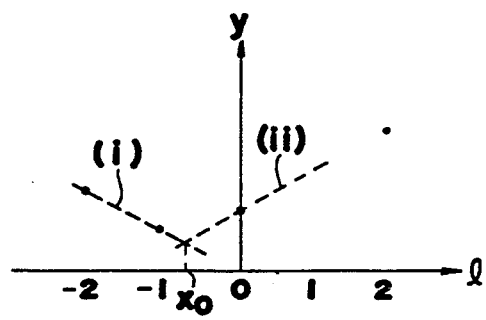
Figure 10:
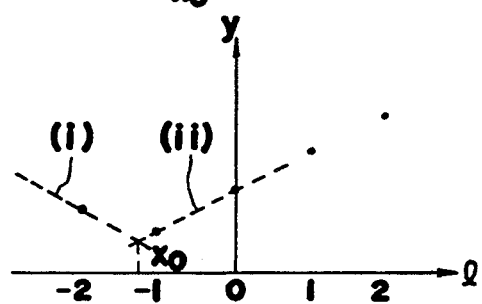
Figure 10:
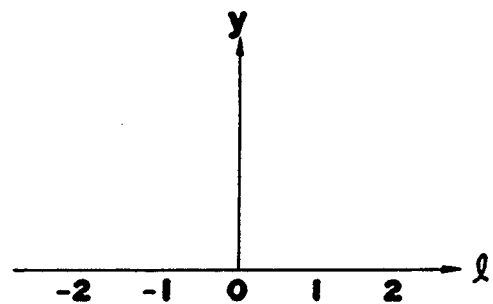
Figure 10:
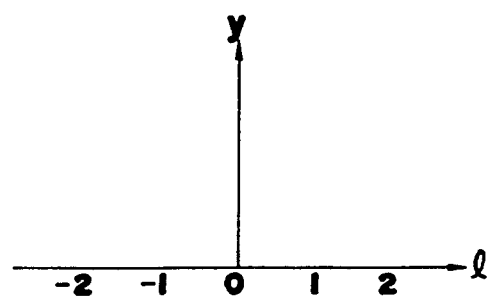

First of all, the smallest $C(l,m)$ value, $C(l_0, m_0)$ is found. Depending on the relationship among the values of $l_0$, $C(l_0-1,m_0)$ and $C(l_0+1,m_0)$, there exist possible cases (a) through (h) as shown in FIG. 10.

Case (a)

It is determined that $0 \leq x_0 < 1$.

$x_0$ is the 1 coordinate of the intersecting point of Straight Line (i), connecting Point $(-1, C(-1,m_0))$ and Point $(0,C(0,m_0))$, and Straight Line (ii), connecting Point $(1,C(1,m_0))$ and Point $(2, C(2,m_0))$.

$$X_0 = \frac{-C(2, m_0) + 2 \cdot C(1, m_0) - C(0, m_0)}{C(0, m_0) - C(-1, m_0) - C(2, m_0) + C(1, m_0)}$$

Case (b)

It is determined that $0 < x_0 < 1$ $x_0$ is the 1 coordinate of the intersecting point of Straight Line (i), connecting Point $(-2, C(-2,m_0))$ and Point $(-1, C(-1,m_0))$, and Straight Line (ii), connecting Point $(0,C(0,m_0))$ and Point $(1, C(1,m_0))$.

$$X_0 = \frac{C(0, m_0) - 2 \cdot C(-1, m_0) + C(-2, m_0)}{C(-1, m_0) - C(-2, m_0) - C(1, m_0) + C(0, m_0)}$$

Case (c)

It is determined that $0 < x_0 < 1$

The rest is the same as in the case (a).

$$X_0 = \frac{-C(2, m_0) + 2 \cdot C(1, m_0) - C(0, m_0)}{C(0, m_0) - C(-1, m_0) - C(2, m_0) + C(1, m_0)}$$

Case (d)

It is determined that $1 < x_0 < 2$ $x_0$ is the 1 coordinate of the intersecting point of Straight Line (i), connecting Point $(0, C(0,m_0))$ and Point $(1, C(1,m_0))$. and Straight Line (ii), which passes through Point $(2,C(2,m_0))$ and inclines at the same angle but in the opposite direction as Line (i).

$$X_0 = \frac{-3 \cdot C(0, m_0) + 2 \cdot C(1, m_0) + C(2, m_0)}{2 \cdot (C(1, m_0) - C(0, m_0))}$$

Case (e)

It is determined that $-1 \leq x_0 < 0$.

The rest is the same as in case (b).

$$X_0 = \frac{-C(0, m_0) - 2 \cdot C(-1, m_0) + C(-2, m_0)}{C(-1, m_0) - C(-2, m_0) - C(1, m_0) + C(0, m_0)}$$

Case (f)

It is determined that $-2 < x_0 < -1$.

$x_0$ is the 1 coordinate of the intersecting point of Straight Line (ii), connecting Point $(-1, C(-1,m_0))$ and Point $(0, C(10,m_0))$, and Straight Line (i), which passes through Point $(-2,C(-2,m_0))$ and inclines at the same angle but in the opposite direction as Line (ii).

$$X_0 = \frac{-3 \cdot C(0, m_0) + 2 \cdot C(-1, m_0) + C(-2, m_0)}{2 \cdot (C(0, m_0) - C(-1, m_0))}$$

Cases (g) and (h)

It is determined that shake detection is impossible for the reason that the shake exceeds the largest imagined shake.

Given above is the procedure to find $x_0$, but $Y_0$ can also be found in the same manner.

Next, the Driving Circuit for Correction Lens 32, shown in FIG. 3A, will be explained.

Figure 11:
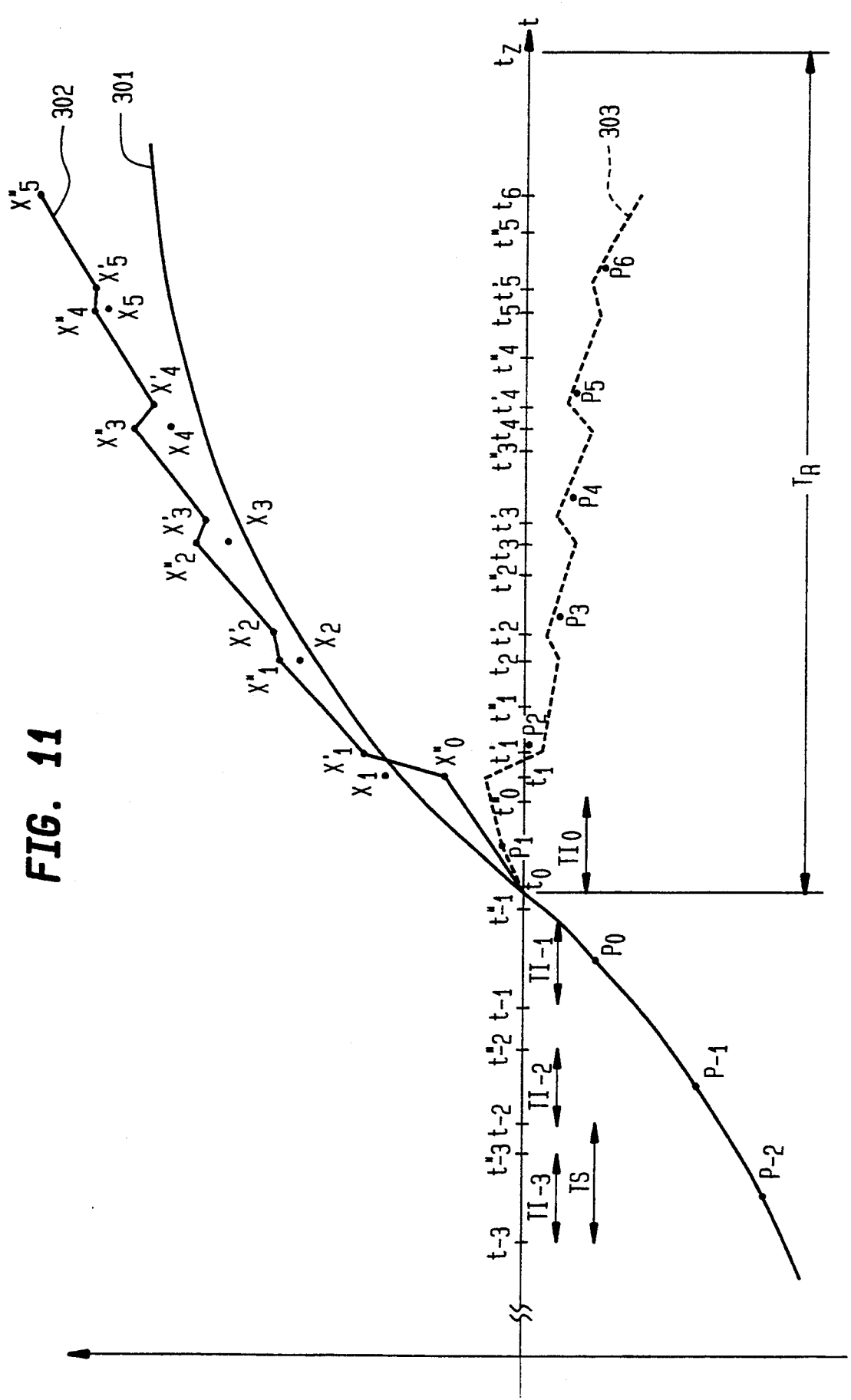
FIG. 11 is a drawing explaining how the correction lens is driven.

FIG. 11 is a drawing explaining the Driving Circuit for Correction Lens 32. In this explanation, only the horizontal component of the image shake is considered. In FIG. 11, the horizontal axis t represents time and the vertical axis x represents the location of the image. Times $t_{-3}$, $t_{-2}$, $t_{-1}$, etc. represent the times when CCD 51 begins performing integration, and times $t_{-3}''$, $t_{-2}''$, $t_{-1}''$, etc. represent the times when performance of integration is completed. Interval $TI_1$ spent for performance of integration is calculated as $TI_i = t_i'' - t_i$.

When the photo subject is illuminated by an AC light source, the time interval for performance of integration is changed so that the exposure of CCD 51 is kept at the same level. Therefore, the time interval for performance varies.

The intervals between integration starting times $t_{-3}$, $t_{-2}$, $t_{-1}$, etc. are equal. Curved Line 301 represents the locus of the image on CCD 51 when there is image shake. When camera shake is not corrected by Correction Lens 32, the image moves on this line. Since shake correction starts at $t=t_0$, Curved Line 301 is drawn to pass through Point $(t_0,0)$. Jagged Line 302 represents the locus of Correction Lens 32. Dotted Line 303 represents the locus of the image on CCD 51 when shake correction is performed. Points $P_{-2}$, $P_{-1}$, $P_0$, etc. represent the average location of the image during the time period when integration is being performed, i.e., $t_{-3} \sim t_{-3}''$, $t_{-2} \sim t_{-2}''$, $t_{-1} \sim t_{-1}''$, and so on. CCD data processed by integration during the period $t_i \sim t_i''$ are read out during the period $t_{i+1} \sim t_{i+2}$, and are further calculated. Then $P_i$, the location of the image, is found. Based on the data thus obtained, Correction Lens 32 begins to operate at $t_{i+2}$.

In the following explanation, $P_{-2}$, $P_{-1}$, $P_0$, etc., $X_1$, $X_2$, $X_3$, etc., $X_1'$, $X_2'$, $X_3'$, etc., $X_1''$, $X_2''$, $X_3''$, etc. are used as the names of points, but they also represent the values of the x coordinate.

In order to begin shake correction at $t=t_0$, it is necessary to find the shake velocity during the interval between $t_0$ and $t_1$. The shake velocity is determined from the change in location of the image between the most recent two points, and it is expected that the shake velocity during interval $t_0 \sim t_1$ is the same. The latest known location of the image at point $t=t_0$ is $P_{-1}$. Since the time between $P_{-2}$ and $P_{-1}$ is $TS-(TI_{-3}TI_2)/2$, the predicted shake speed $Vx_0$ is $$V_{x0} = \frac{P_{-1} - P_{-2}}{TS - \frac{TI_{-3} - TI_{-2}}{2}}$$

Therefore, the Shake Correction Optical System is operated at velocity $Vx_0$ during the interval $t_0 \sim t_1$.

Next, the case when $t=t_1$ will be explained. Since Correction Lens 32 was operated at velocity $Vx_0$, it has now moved to the location $X_0$. The location $P_0$ is known at this point, so that the predicted shake velocity during the interval $t_1 \sim t_2$ may be obtained by the following calculation:

$$V_{x1} = \frac{P_{-0} - P_{-1}}{TS - \frac{TI_{-2} - TI_{-1}}{2}}$$

Because velocity $Vx_1$ is obtained based on the latest data on the location of the image, it may be considered to be more precise than $Vx_0$ as a predicted shake velocity during the interval $t_0 \sim t_1$. Therefore, prediction error $ERx_1$ is found through the following calculation:

$$ERx_1 = (Vx_0 - Vx_1) \cdot TS$$

From these, values, the location of the image $X_1$ at $t=t_1$ is predicted by the following formula:

$$X_1 = Vx_0 \cdot TS - G \cdot ERx_1 = \{Vx_0 - G(Vx_0 - Vx_1)\} \cdot TS$$

G is called the prediction coefficient, and FIG. 11 shows an example where G =2; At this point Correction Lens 32 must be moved to the newly predicted point $X_1$, for which action time interval $t_1 \sim t_1'$ is needed. Since it is predicted that the image will move to the location $X_1'$ during that time, Correction Lens 32 is moved to the location, $$X_1' = X_1 + Vx_1 \cdot (t_1' - t_1)$$

and is operated at velocity $Vx_1$ during the interval $t_1' \sim t_2$.

Next, the case when $t=t_2$ will be explained. By this time, Correction Lens 32 has moved to the location $X_1''$, as expressed by $$X_1'' = X_1 + Vx_1 \cdot TS$$

Since the location of $P_1$ is known at this point, the predicted shake velocity during the interval $t_2 \sim t_3$ can be calculated as follows:

$$V_{x2} = \frac{P_1 - P_0 + V_{x1} \cdot \frac{TI_0}{2}}{TS - \frac{TI_{-1} - TI_0}{2}}$$

$Vx_2$ may be considered to be more precise than $Vx_1$ as a predicted shake velocity during the interval $t_1 \sim t_2$. Therefore, prediction error $ERx_2$ is calculated as follows:

$$ERx_2 = (Vx_1 - Vx_2) \cdot TS$$

From these values, the location of the image $X_2$ at $t=t_2$ is predicted to be:

$$X_2 = X'' - G \cdot ERx_2 = X_1 + \{Vx_1 - G(Vx_1 - Vx_2)\} \cdot TS$$

Now, Correction Lens 32 must be moved to the newly predicted point $X_2$, for which action the time interval $t_2 \sim t_2'$ is needed. Since it is predicted that during this interval the image will move to the location $X_2'$, Correction Lens 32 is moved to the location $$X_2' = X_2 + Vx_2 \cdot (t_2' - t_2)$$

and is operated at velocity $Vx_2$ during the interval from $t_2' - t_3$.

Next, the case when $t=t_3$ will be explained. Now, Correction Lens 32 is located at $X_2''$, calculated by $$X_2'' = X_2 + Vx_2 \cdot TS$$

Since the location of $P_2$ is known at this point, the predicted shake velocity during $t_3 \sim t_4$ can be calculated as follows:

$$V_{x3} = \frac{P_2 - P_1 + V_{x2} \cdot \left(TS - \frac{TI_0 - TI_{-1}}{2}\right)}{TS - \frac{TI_0 - TI_1}{2}}$$

(Provided, however, that the interval $t=t_1 \sim t=t_1'$ is disregarded.)

Since $Vx_3$ may be considered to be more precise than $Vx_2$ as a predicted shake velocity during the interval $t_2 \sim t_3$, prediction error $ERx_3$ is given by the following calculation:

$$ERx_3 = (Vx_2 - Vx_3) \cdot TS$$

From these values, the location of the image $X_3$ at $t=t_3$ is predicted to be:

$$X_3 = X_2'' - G \cdot ERx_3 = X_2 + \{Vx_2 - G(Vx_2 - Vx_3)\} \cdot TS$$

Now, Correction Lens 32 must be moved to the newly predicted point $X_3$, for which action the time interval $t_3 \sim t_3'$ is needed. Since it is predicted that the image will move to the location $X_3'$, Correction Lens 32 is moved to the location $$X_3' = X_3 + Vx_3 \cdot (t_3' - t_3)$$

and is operated at velocity $Vx_3$ during the interval $t_3' \sim t_4$.

In the same manner, $X_4$, $Vx_4$, $X_5$, $Vx_5$, etc. are obtained and the shake correction optical system is operated.

In this embodiment, the prediction coefficient G was freed. However, it may be changed during the shake correction sequence depending how the shake detection is performed. If the prediction error value ER does not decrease, or if the positive/negative value of the prediction error $ER_i$ does not reverse after several shake correction operations, the prediction coefficient G may be increased. Also, in the event the positive/negative value of the prediction error $ER_i$ continues to alternate, prediction coefficient G may be reduced.

Referring to FIG. 11, the time interval TR from $t_0$ to $t_z$ represents the camera's exposure time. As is seen in the fig., the shake correction sequence is repeated several times during this exposure interval TR. That means that shake correction is carried out not just once or twice, but several times at least. Therefore, the actual calculation of the degree of the shake, and the subsequent shake correction calculations, must be performed within a relatively short period of time. Time intervals $TI_3$, $TI_2$, $TI_0$, $TI_n$, etc., spent for performance of integration by the sensor to detect camera shake, must also be short. While the exposure time TR is of the order of 10 to 1000 milliseconds, that of $TI_n$ is only a few milliseconds. Unless this relationship is maintained, shake correction will be ineffective.

As explained above, in this invention, shake detection is performed using the output data from an area sensor which detects the image of the photo subject, and shake correction is carried out based on the detected degree of shake, as described above.

Next, the interface between interchangeable Lens 3 and Camera Body 12 will be explained. From interchangeable Lens 3 is input its own information corrective magnification KBLX and KBLY (values corresponding to each focal length in case of zooming, calculated as follows):

(Degree of movement of the image on the film)/(drive pulse).

Then, the drive pulse values Xi=degree of movement of the image $X_0$/corrective magnification KBLX, or Y1=degree of movement of the image $Y_0$/corrective magnification KBLY, are found.

The data necessary to perform the above-described lens operation, namely,
1) Direction X: positive or negative;
2) Operation velocity $Vx_i$;
3) Drive pulse Xi;
4) Drive pulse Xi';
5) Direction Y: positive or negative;
6) Operation velocity $Vy_i$;
7) Drive pulse Yi;
8) Drive pulse Yi' and
9) Reset signal to return to the original position
are then output to the lens. Reset signal 9 is set only when the lens is to be returned to its original position which is center of driving range of Correction Lens 32, and Correction Lens 32 is returned to Its original position only when this signal is sent.

Based on the input data, Correction Lens 32 is operated as described above. When undetectable data is output, the same data transmitted the previous time is output.

Next, control of the time spent for performance of integration by CCD 51 will be explained.

Figure 12A:
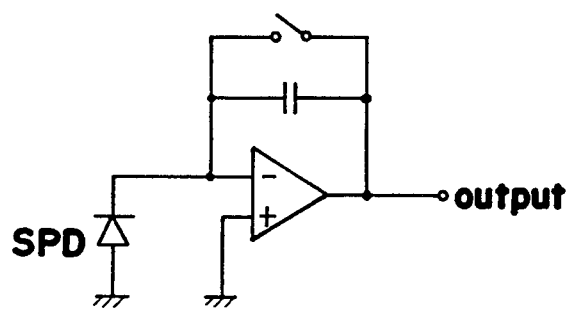
FIGS. 12A and 12B are circuit diagrams which illustrate the circuits controlling the CCD's integral time function.

FIG. 12A illustrates a circuit to control the time for CCD 51's performance of integration, which includes a light-intensity monitoring SPD and a Light Measuring Circuit. The Light Measuring Circuit includes an integration circuit and a reset switch. The light-intensity monitoring SPD is located in the vicinity of the image-sensing area of CCD 51. Photoelectric current, output from the light-intensity monitoring SPD, is processed by the integration circuit. The output of the integration circuit is proportional to the amount of light coming into the light-intensity monitor during the performance of integration.

The light-intensity monitor and Light Measuring Circuit are employed in order to keep the output of CCD 51 at the same level even when the photo subject is illuminated by an AC light source such as a fluorescent lamp. This is because the output would fluctuate each time if the time for CCD 51's performance of integration were fixed when photographing a subject illuminated by an AC light source. This will be explained in detail below.

In order to stabilize the output of CCD 51, the time for integration must be adjusted according to the light-intensity of the photo subject. In this embodiment, integration begins to be performed in the Light Measuring Circuit at the same time as in CCD 51, and the degree of exposure of CCD 51 is monitored via the output of the integration circuit.

Figure 12B:
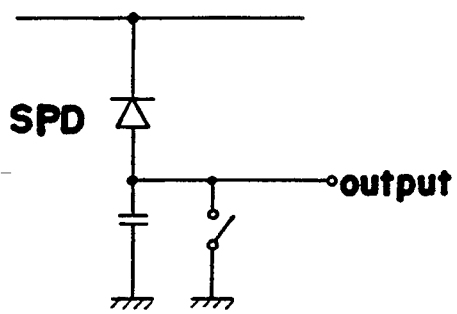

FIG. 12B is a modified version of FIG. 12A.

Next, the operation of the integration time controlling circuits shown in FIGS. 12A and 12B where CCD 51 is used as a shake detection sensor will be explained. The reset switch is turned "ON", resetting the integration circuit. The electric load in the storage unit of the CCD is cleared. When CCD 51 begins to perform integration, the reset switch is turned "OFF", and the Light Measuring Circuit begins to perform integration.

Figure 13:
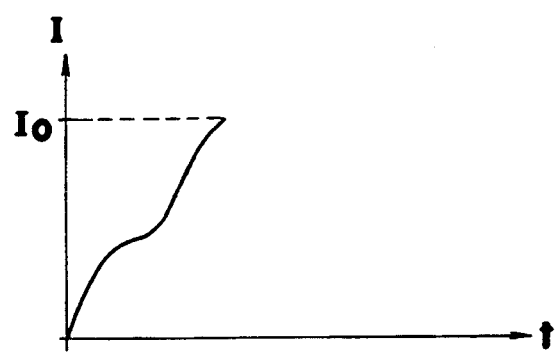
FIG. 13 is a drawing illustrating changes in output from the Light Measuring Circuit along a time axis; and, FIGS. 14 through 16 are flow charts explaining the operations of the Main CPU and the Control CPU of the shake-detecting camera with an electronic finder provided by this invention.

FIG. 13 illustrates changes in output of the Light Measuring Circuit along a time axis. The horizontal axis t represents time spent for integration and the vertical axis I represents the amount of the output of the Light Measuring Circuit. When the photo subject is illuminated by an AC light source, the output from the Light Measuring Circuit ascends in a curved line as shown in the fig.. The photometric output is compared with an appropriate standard $I_0$ and when the photometric output I reaches $I_0$, the integration circuit is reset and CCD 51's performance of integration is discontinued. The output of CCD 51 is read out and it is determined whether or not the degree of exposure is appropriate. When the degree of exposure is determined to be appropriate, the standard $I_0$ is used for subsequent exposure. When it is determined to be not appropriate, the degree of exposure is multiplied, for example, by K, $I_0 \times K$ becomes the new standard $I_0$, and subsequent exposures are performed.

Next, the operation of the integration time controlling circuits where CCD 51 is used as an image-capturing element for the electronic finder will be explained. Based on the output signal from Light Measuring Circuit 31, the output signal from Exposure Compensation Amount Input Means 22 and the signal from ISO Determining Circuit 23 are set at Standard $I_0$ (details of which will be explained in the Main CPU's sequence step #70 in FIG. 14.)

Now, the camera sequence including the above-described shake detection and control and remote finder will be explained based on the flow charts for the Main CPU and for the shake- correction Control CPU.

Figure 14:
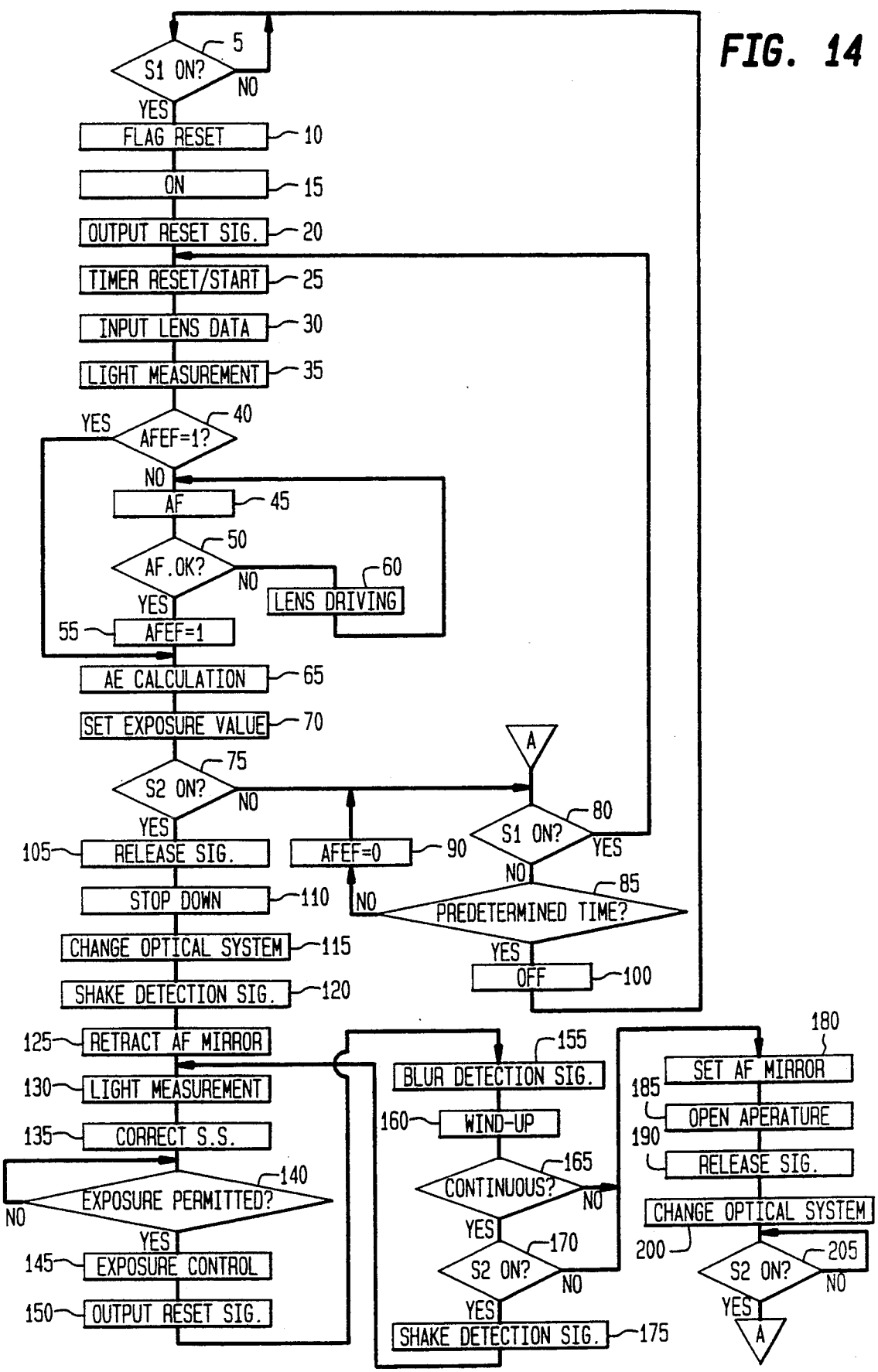

First, the sequence of Main CPU 1 will be explained. In FIG. 14, the Main CPU is on wait in the loop of Step #5 (hereinafter "Step" will be omitted). Namely, it is waiting in the loop of #5 for Switch S1 to turn "ON" by the first stroke of the shutter release button. When Switch S1 turns "ON", the AF completion flag AFEF and signal are reset (#10), and necessary circuits are switched "ON", including Light Measuring Circuit 31, Auto-Focus Module 14 and Shake Correcting Circuit 18 (#15). Then the reset signal of Correction Lens 32 is output to Taking Lens 3 (#20). the timer is started after being reset (#25). the lens data of Taking Lens 3 is input (#30), and full-aperture metering is performed (#35).

In #40, it is determined whether the AF completion flag AFEF is 1: if it is 1, the program jumps to #65, and if it is not, it advances to #45. In #45, auto-focusing is performed. In #50, it is determined whether the camera is in focus or not as a result of the auto-focusing in #45. If it is in focus, the program goes to #55, and if not, it is diverted to #60. In #60, after Taking Lens 3 is moved to the focal point, the program jumps back to #45.

In #55, the AF completion flag AFEF becomes 1.

In #65, auto-exposure calculations are performed based on the photometric information obtained in #35, as well as on the film sensitivity and the distance information obtained as a result of the auto-focusing in #45. In #70, the exposure value for CCD 51 is set.

In #75, it is determined whether Switch S2, which is turned "ON" by the second stroke of the shutter release button, is "ON". If it is "ON", the program goes to #105, and if it is not, it is diverted to #80. In #80, it is determined whether Switch S1 is "ON". If it is "ON", the program jumps back to #25. If it is not "ON", it means the shutter release button has not been pressed; therefore, it is determined in #85 by a timer whether a prescribed interval has elapsed. If such interval has elapsed, the program jumps back to #5, the waiting stage, after turning "OFF"(#100) certain circuits * including Light Measuring Circuit 3, Auto-Focus Module 14 and Shake Correcting Circuit 18. If the interval has not elapsed, the AF completion flag AFEF is set to 0 (#90), and the program advances to #80.

In #105, since the second stroke of the shutter release button is pressed, the release signal becomes an "H" level signal, which fact is then transmitted to the Control CPU. In #110, the aperture of Taking Lens 3 is stopped down to the level obtained in the auto-exposure calculation in #65. Switchover occurs from Electronic Finder Optical System 41 to Shake Detecting Optical System 40 (#115), the shake detection signal becomes an "H" level signal, and the shake detection sequence of the Control CPU commences (#120). Auto-Focus Mirror 7 is retracted (#125), stop-down metering for measuring light passed through an aperture stopped-down is performed (#130), and the shutter speed is corrected according to the auto-exposure calculations (#135).

In #140, the program waits for the exposure permission signal from the Control CPU to reach "H" level. When the signal reaches "H" level, Shutter 9 is released, and exposure control is performed (#145). When the exposure is completed, reset signal is output to Taking Lens 3 (#150), Correction Lens 32 is returned to the original position, the shake detection signal becomes an "L" level signal, and the Control CPU is informed that the exposure is complete (#155).

Film winding is performed (#160), and it is determined whether the camera is in continuous photo mode (#165). If it is not in continuous photo mode, the program diverts to #180: if it is in continuous photo mode, the program goes to #170 and it is determined whether Switch S2 is "ON". If Switch S2 is "OFF", the program diverts to #180 because continuous photographing is not available, even if the camera is in continuous photo mode. If Switch S2 is "ON", the camera performs continuous photographing; therefore, the shake detection signal becomes an "H" level signal (#175) and the program jumps back to #130.

Subsequently, Auto-Focus Mirror 7 is returned to the auto-focusing point (#180), the aperture of Taking-Lens 3 is opened (#185), and the release signal becomes "L" level (#190), which fact is transmitted to Control CPU 1. Switchover then occurs from Shake Detecting Optical System 40 to Electronic Finder Optical System 41 (#200). Then the program waits for S2 to turn "OFF" (#205), and it jumps back to #80 to be ready for the next photo-taking.

Figure 15:
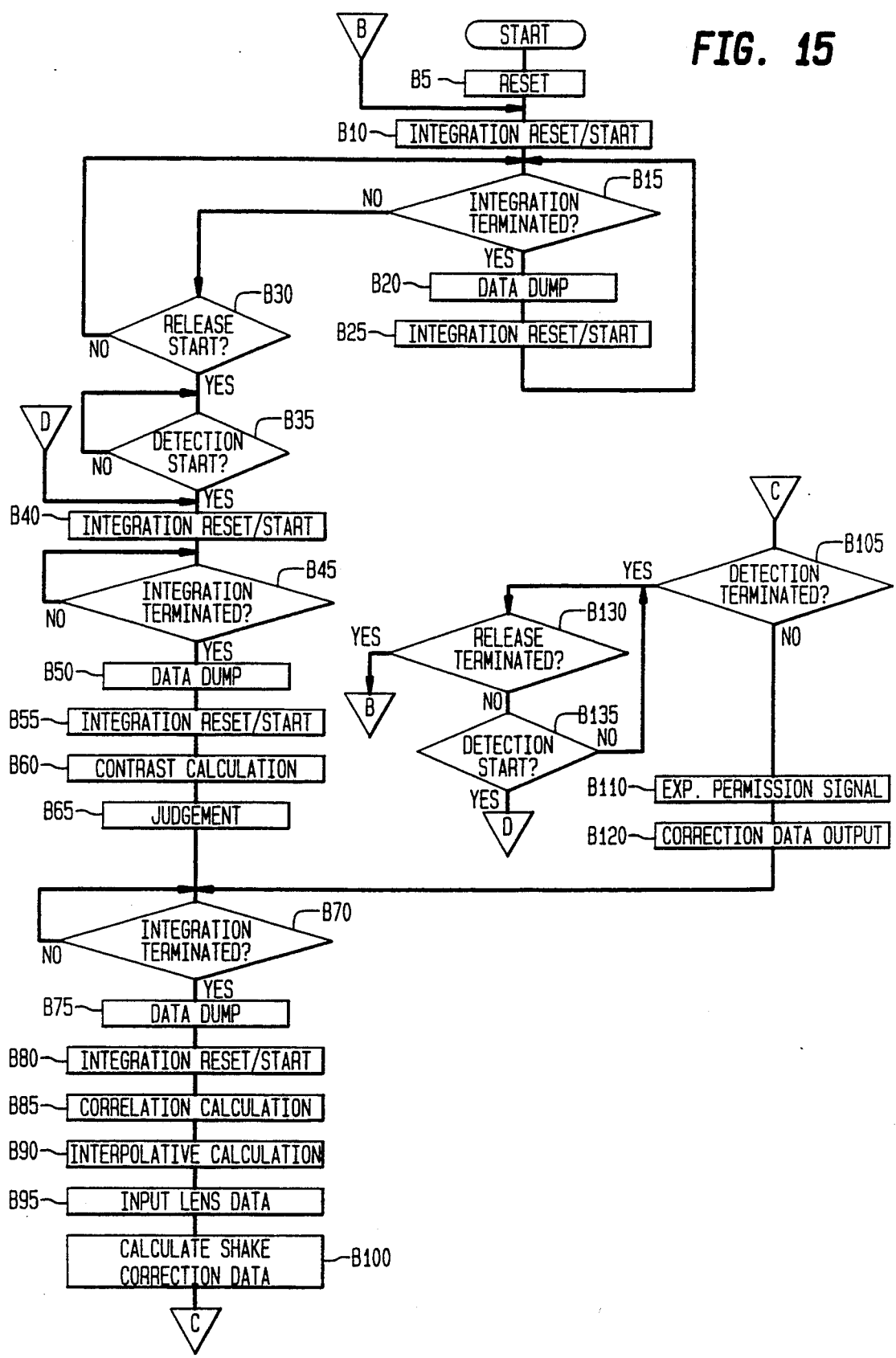

Next, the operation of the Control CPU will be explained with reference to FIG. 15. In #15 in FIG. 14, Shake Correcting Circuit 18 is turned "ON", stag the sequence. The flag and output signals are reset (#85), and CCD 51 starts performing integration after reset (#B10). When the integration is completed in #B15, the data read out from the calculation is dumped in Image Memory 64. (#B20). The dumped data is read out in sequence and D/A conversion occurs. Then the image is displayed on LCD 63 by Image Signal Processing Circuit 62. In #B25, after the integration of CCD 51 is reset, integration starts and the program jumps back to #B15.

When integration is not completed in #B15, the program is diverted to #B30. In #B30, the release signal from the Main CPU is checked; if it is in "H" level, the program advances to #B35, and if it is in "L" level, the program diverts to #B15. In #B35, the program waits until #B35 the shake detection signal from the Main CPU becomes "H" level before shake detection begins.

When the shake detection signal becomes "H" level, performance of integration is begun after reset of integration in the CCD 51(#B40). At this point, the Main CPU has already switched the optical system to Shake Detecting Optical System. In #B45, the program waits for CCD 51 to complete the performance of integration. After the CCD 51 has completed performance of integration, the data read out from the calculation is dumped to Basic Memory 65 and Reference Memory 66 (#B50). After CCD 51's integration is reset, integration is begun (#55).

Contrast calculation is performed (#B60) and blocks to be used for shake detection are selected (#B65). The program waits for CCD 51 to complete integration (#B70). When the integration is completed, data read out of the calculation is dumped to Reference Memory 66 (#B75), and after CCD 51's integration is reset, integration is begun.

Correlative calculation (#B85) and interpolative calculation (#B90) are performed, and the degree of image shake is detected. Lens data from Taking Lens 3 are read out (#B95) and the degree and direction of shake for shake correction by Correction Lens 32 is calculated (#B100).

In #B105, it is determined whether the shake detection signal from Main CPU is in "L" level; if it is in "L" level, the program diverts to #B130 because shake detection is completed, and if it not in "L" level, the program advances to #B110 because shake detection continues. The exposure permission signal becomes "H" level (#B110), informing the Main CPU, that exposure can be begun, lens control data is output to Taking Lens 3 (#B120), and the program jumps back to #B70.

In #B130, it is determined whether the release signal from Main CPU is in "L" level or not: if it is in "L" level, the program jumps back to #B10 because the photographing process is completed, and if it is not in "L" level, the program advances to #B135, because continuous photographing is taking place, and it waits for the detection signal to become "H" level. When the detection signal becomes "H" level, the program jumps back to #B40.

Figure 16:
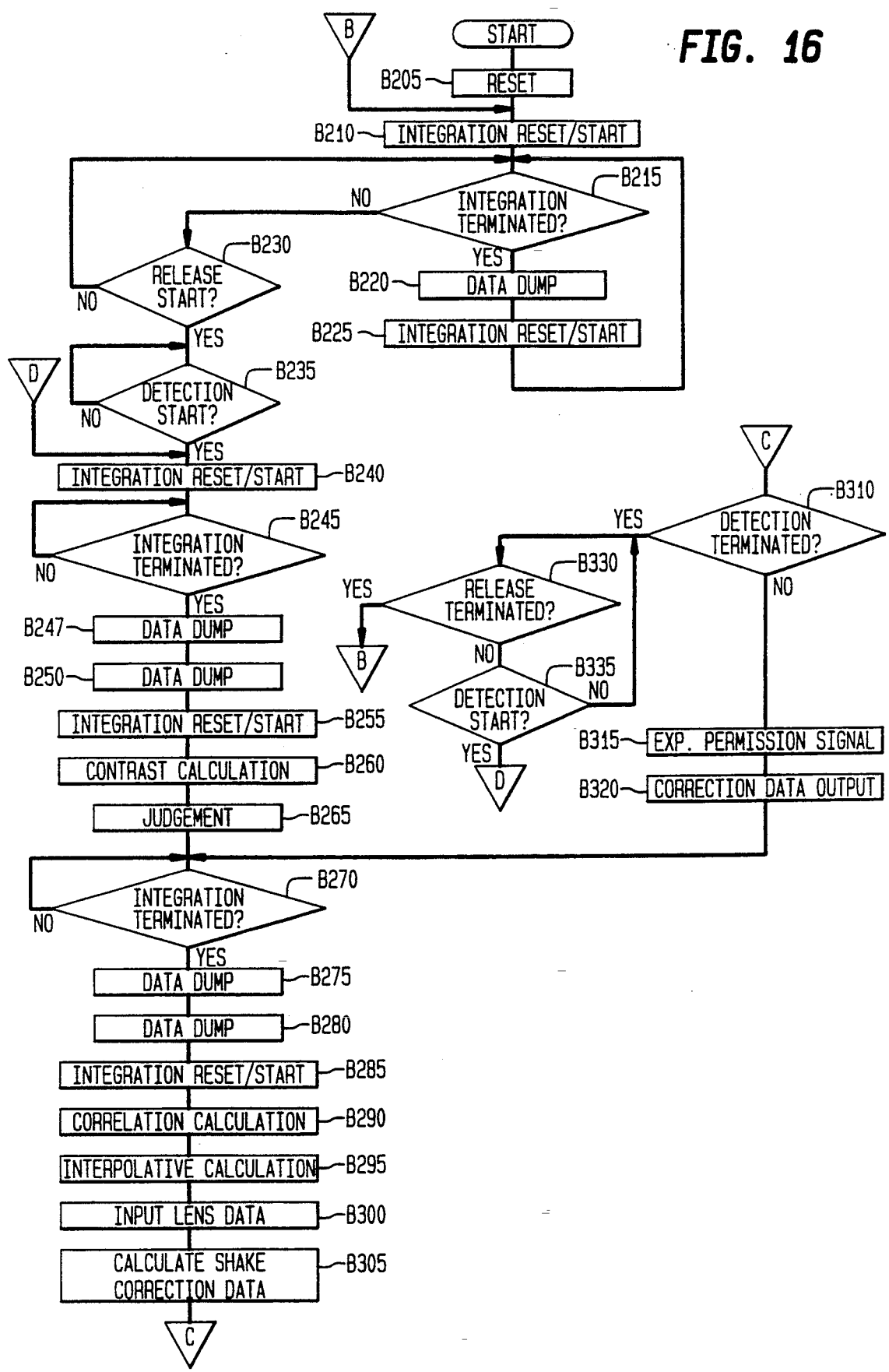

FIG. 16 illustrates another embodiment of the Control CPU. Even after release has begun, data is dumped to the image memory in #B247 and #B275 and shake detection image information is displayed. In other words, the entire photo area is displayed on LCD 63 until just before exposure begins; after exposure commences, system switchover occurs and the shake detection area is displayed on the LCD.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera capable of detecting camera shake, comprising:
    detecting means for detecting camera shake repeatedly;
    calculating means for calculating a moving speed of subject image based on the detected camera shake;
    an optical system operable to correct the camera shake;
    driving means for driving said optical system; and
    predicting means for predicting an amount of drive of said driving means to be driven based on the calculated moving speed and an interval of the camera shake detection.

2. A camera as stated in claim 1, wherein said predicting means includes means for calculating an error between a position of said optical system and a position of the subject image after said driving means drives said optical system for the predicted amount of drive.

3. A camera as stated in claim 7 wherein said predicting means newly predicts an amount of drive of said driving means in consideration of the error each time said detecting means newly detects camera shake.

4. A camera as stated in claim 1, further comprising image sensing means for converting the subject image into electric signals, wherein said detecting means detects camera shake based on the electric signals.

5. A camera as stated in claim 4, further comprising means for dividing the path of light passing through the optical system into a first path for guiding light to a film plane and a second path for guiding light to the image sensing means, wherein said detecting means detects camera shake during an exposure operation based on the light guided to the image sensing means.

6. A camera capable of detecting camera shake, comprising:
    detecting means for detecting camera shake repeatedly;
    an optical system operable to correct the camera shake;
    driving means for driving said optical system;
    first calculating means for calculating a moving speed of subject image based on the detected camera shake;
    second calculating means for calculating an error between a position of said optical system and a position of the subject image;
    predicting means for predicting a driving amount of said driving means based on the calculated moving speed, an interval of the camera shake detection, and the calculated error each time said detecting means newly detects a camera shake; and
    producing means for producing a weighting coefficient to change a weight of the error in predicting the driving amount.

7. A camera as stated in claim 6, wherein said weighting coefficient varies in accordance with an amount of the calculated error.

8. A camera as stated in claim 6, further comprising image sensing means for converting the subject image into electric signals, wherein said detecting means detects camera shake based on the electric signals.

9. A camera as stated in claim 8, further comprising means for dividing the path of light passing through the optical system into a first path for guiding light to a film plane and a second path for guiding light to the image sensing means, wherein said detecting means detects camera shake during an exposure operation based on the light guided to the image sensing means.

* * * * *